(12) United States Patent
Fujita et al.

(10) Patent No.: US 9,027,726 B2
(45) Date of Patent: May 12, 2015

(54) TORQUE TRANSMISSION DEVICE

(75) Inventors: Yasuhiko Fujita, Moriyama (JP);
Kousuke Murata, Yawata (JP)

(73) Assignee: EXEDY Corporation, Osaka (JP)

( * ) Notice: Subject to any disclaimer, the term of this patent is extended or adjusted under 35 U.S.C. 154(b) by 24 days.

(21) Appl. No.: 13/983,723

(22) PCT Filed: Jan. 25, 2012

(86) PCT No.: PCT/JP2012/051512
§ 371 (c)(1),
(2), (4) Date: Aug. 5, 2013

(87) PCT Pub. No.: WO2012/108259
PCT Pub. Date: Aug. 16, 2012

(65) Prior Publication Data
US 2013/0310218 A1    Nov. 21, 2013

(30) Foreign Application Priority Data

Feb. 7, 2011    (JP) ................................ 2011-023541

(51) Int. Cl.
*F16D 13/70*    (2006.01)
*B60W 20/00*    (2006.01)
*B60K 6/26*    (2007.10)
*B60K 6/387*    (2007.10)
*B60K 6/405*    (2007.10)
*B60K 6/48*    (2007.10)
*F16D 13/54*    (2006.01)
*F16D 25/08*    (2006.01)
*B60W 10/02*    (2006.01)
*B60W 10/10*    (2012.01)

(52) U.S. Cl.
CPC ............... *B60W 20/40* (2013.01); *Y10T 477/26* (2015.01); *Y10T 477/641* (2015.01); *F16D 13/70* (2013.01); *B60K 6/26* (2013.01); *B60K 6/387* (2013.01); *B60K 6/405* (2013.01); *B60K 6/48* (2013.01); *F16D 13/54* (2013.01); *F16D 25/087* (2013.01); *Y02T 10/6221* (2013.01); *B60W 10/02* (2013.01); *B60W 10/10* (2013.01); *Y10S 903/902* (2013.01)

(58) Field of Classification Search
USPC ............ 192/85.07–85.1, 85.48, 85.49, 85.51, 192/85.53, 85.59, 70.29
See application file for complete search history.

(56) References Cited

U.S. PATENT DOCUMENTS

| 6,347,695 | B1 * | 2/2002 | Kuhn et al. | ................. | 192/85.07 |
| 6,648,117 | B2 * | 11/2003 | Shoji et al. | ................. | 192/85.49 |
| 8,240,441 | B2 * | 8/2012 | Heeke | ......................... | 192/3.25 |

(Continued)

FOREIGN PATENT DOCUMENTS

| JP | 05-071554 A | 3/1993 |
| JP | 2001-522012 A | 11/2001 |

(Continued)

Primary Examiner — Jacob S Scott
(74) Attorney, Agent, or Firm — Global IP Counselors, LLP

(57) ABSTRACT

It is an object of the present invention to provide a compact torque transmission device. The torque transmission device includes an input-side member, an output-side member, a clutch and a pressing mechanism. The clutch is configured to transmit or cut torque between the input-side member and the output-side member. The pressing mechanism includes a pressing member for pressing the clutch, and a pressing device. The pressing device is a device for pressing the pressing member, and is disposed on the inner peripheral side of the clutch.

7 Claims, 4 Drawing Sheets

(56) References Cited

U.S. PATENT DOCUMENTS

| | | | |
|---|---|---|---|
| 8,863,926 B2 * | 10/2014 | Knowles | 192/48.611 |
| 2007/0240961 A1 * | 10/2007 | Gremplini et al. | 192/87.11 |
| 2008/0041688 A1 | 2/2008 | Bauer et al. | |
| 2008/0047799 A1 * | 2/2008 | Combes et al. | 192/58.5 |
| 2011/0088958 A1 * | 4/2011 | Ebert et al. | 192/207 |
| 2011/0240431 A1 * | 10/2011 | Iwase et al. | 192/3.29 |
| 2011/0259698 A1 * | 10/2011 | Arnold et al. | 192/48.1 |
| 2012/0080286 A1 * | 4/2012 | Kasuya et al. | 192/113.3 |

FOREIGN PATENT DOCUMENTS

| | | |
|---|---|---|
| JP | 2003-170752 A | 6/2003 |
| JP | 2004-322873 A | 11/2004 |
| JP | 2006-010065 A | 1/2006 |
| JP | 2010-151313 A | 7/2010 |
| WO | 99-22955 A | 5/1999 |

* cited by examiner

TORQUE TRANSMISSION DEVICE

CROSS-REFERENCE TO THE RELATED APPLICATIONS

This U.S. national phase application claims priority to Japanese Patent Application Nos. 2011-023541 filed on Feb. 7, 2011. The entire disclosure of Japanese Patent Application No. 2011-023541 is hereby incorporated herein by reference

TECHNICAL FIELD

The present invention relates to a torque transmission device, and particularly to a torque transmission device for transmitting torque of an engine to a transmission and for assisting the engine.

BACKGROUND ART

In recent years, various torque transmission devices have been developed, and a torque transmission device capable of assisting an engine has been proposed as one of those devices (see PTL 1). For example, a motor generator is disposed in this type of torque transmission device. In the torque transmission device, the motor generator executes regeneration of extracting kinetic energy in travelling as electricity, whereas electricity stored in a battery is converted into rotation of the motor generator and the obtained rotation is inputted into a transmission.

In the torque transmission device, a hybrid drive device is mounted between the engine and the transmission. The hybrid drive device includes a multi-plate dry clutch, a motor generator and a pressing device configured to press the multi-plate dry clutch. In the hybrid drive device, the pressing device and the multi-plate dry clutch are disposed on the inner peripheral side of the motor generator while being aligned in the axial direction. With the arrangement, a clutch is turned on when the multi-plate dry clutch is pressed by the pressing device.

CITATION LIST

Patent Literature

PTL 1: Japan Laid-open Patent Application Publication No.

SUMMARY

Technical Problems

In the well-known torque transmission device, the pressing device and the multi-plate dry clutch are disposed in axial alignment with each other. Further, in the torque transmission device, the pressing device has been configured to be actuated by hydraulic pressure and turning-on/off of the clutch is thereby controlled. In this case, for example, by applying hydraulic pressure to the pressing device in the axial direction, the pressing device is actuated in the axial direction and the clutch is turned on. In the torque transmission device with such structure, the pressing device and the multi-plate dry clutch are disposed in axial alignment with each other. Therefore, the torque transmission device is inevitably increased in the axial dimension thereof, and this has made it difficult to compactly form the torque transmission device.

The present invention has been produced in view of such drawback. It is an object of the present invention to compactly form a torque transmission device.

Solution to Problems

A torque transmission device according to claim 1 is a device for transmitting a torque of an engine to a transmission and for assisting the engine. The present torque transmission device includes an input-side member, an output-side member, a clutch and a pressing mechanism. The clutch is configured to transmit or cut the torque between the input-side member and the output-side member. The pressing mechanism includes a pressing member for pressing the clutch and a pressing device. The pressing device is a device for pressing the pressing member and is disposed on an inner peripheral side of the clutch.

In the present torque transmission device, when the pressing device presses the pressing member, the clutch is configured to be pressured by the pressing member. Accordingly, the clutch is set to be in an on-state and torque is transmitted from the input-side member to the output-side member. By contrast, when pressure of the pressing member onto the clutch is released, the clutch is set to be in an off-state and torque is cut from being transmitted from the input-side member to the output-side member.

In the present torque transmission device, the clutch is set to be in the on-state when the pressing device presses the pressing member on the inner peripheral side of the clutch. Thus, in the present torque transmission device, the clutch can be set to be in the on-state even when the pressing device is disposed on the inner peripheral side of the clutch. Further, in the present torque transmission device, the pressing device is disposed on the inner peripheral side of the clutch. Therefore, the torque transmission device can be reduced in the axial dimension thereof. In other words, according to the present invention, it is possible to provide a compact torque transmission device.

A torque transmission device according to claim 2 relates to the device recited in claim 1, and wherein the pressing device is disposed offset towards the engine with reference to a pressing position in which the pressing member presses the clutch. Here, the pressing device is disposed offset towards the engine with reference to the aforementioned pressing position. Therefore, the torque transmission device can be reliably reduced in the axial dimension thereof.

A torque transmission device according to claim 3 relates to the device recited in claim 2, and wherein the pressing member is pressed by the pressing device in a position offset towards the engine with reference to the aforementioned pressing position. In other words, the pressing member is formed so that the pressing device can press the pressing member in the position offset towards the engine. Accordingly, the clutch can be reliably pressed by the pressing member even when the pressing device is disposed on the inner peripheral side of the clutch.

A torque transmission device according to claim 4 relates to the device recited in claim 2 or 3, and wherein the pressing member is attached to the output-side member and is integrally rotatable with and axially movable with respect to the output-side member. Thus, with attachment of the pressing member to the output-side member, torque can be transmitted to the transmission by the output-side member, while the clutch can be pressed by the pressing member.

A torque transmission device according to claim 5 relates to the device recited in claim 4, and wherein the output-side member has a hole. The pressing member has: a cylindrical portion; a protruding portion outwardly protruding from the cylindrical portion; and a pressing portion formed on an end of the protruding portion in order to press the clutch. The protruding portion is at least partially engaged with the hole of the output-side member.

Here, the protruding portion of the pressing member is engaged with the hole of the output-side member, and thereby, the pressing member is integrally rotatable with and axially movable with respect to the output-side member. Accordingly, torque can be reliably transmitted to the transmission by the output-side member, while the clutch can be reliably pressed by the pressing member.

A torque transmission device according to claim 6 relates to the device recited in any of claim 1 to 5, and further includes a motor generator. The motor generator is the one for assisting the engine, and is disposed on an outer peripheral side of the clutch. For example, when the clutch is in the on-state, the motor generator extracts kinetic energy during travelling as electricity. By contrast, when the clutch is in the off-state, electricity charged into a battery is converted into rotation of the motor generator and the obtained rotation is inputted into the transmission. Even when the motor generator as described above is disposed on the outer peripheral side of the clutch, the torque transmission device can be reduced in the axial dimension thereof. In other words, according to the present invention, it is possible to provide a compact torque transmission device.

A torque transmission device according to claim 7 relates to the device recited in any of claim 1 to 6, and further includes a damper device. The damper device is a device for transmitting the torque of the engine and for absorbing and damping a torsional vibration, and is disposed on an inner peripheral side of the motor generator. Here, the damper device is disposed on the inner peripheral side of the motor generator. Therefore, the torque transmission device can be further reduced in the axial dimension thereof. In other words, according to the present invention, it is possible to provide a more compact torque transmission device.

DETAILED DESCRIPTION OF THE PREFERRED EMBODIMENTS

[Entire Structure of Torque Transmission Device]

Figure 1:
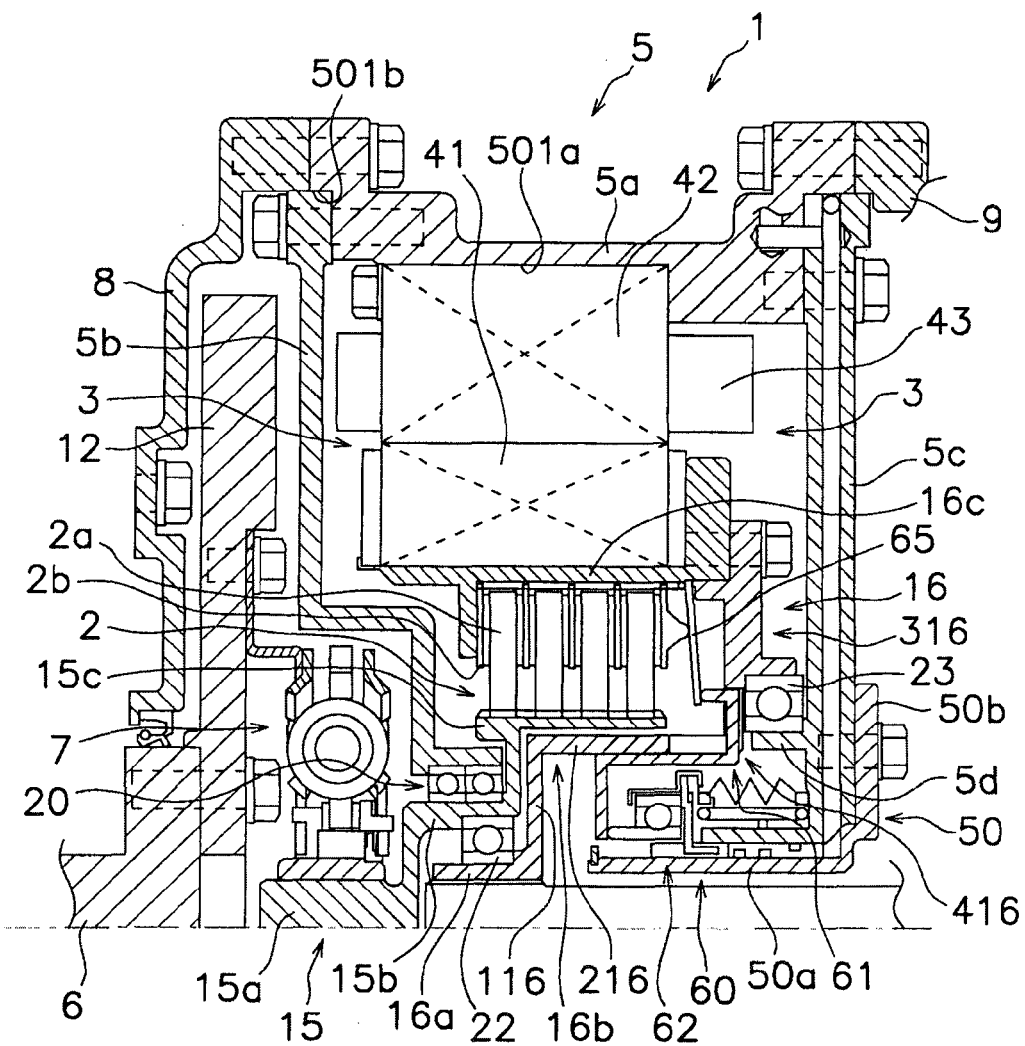
FIG. 1 is a cross-sectional view of a torque transmission device according to an exemplary embodiment of the present invention.

FIG. 1 illustrates a torque transmission device 1 according to an exemplary embodiment of the present invention. The present torque transmission device 1 is a device for transmitting output torque of an engine to a transmission. The torque transmission device 1 includes a torque transmission device housing 5, an input-side member 15, an output-side member 16, a multi-plate clutch 2, a motor generator 3 and a pressing mechanism 60. Further, a damper device 7 is mounted between the torque transmission device 1 and the engine, for instance, between the torque transmission device 1 and a crankshaft 6. It should be noted that in FIG. 1, the left side corresponds to an engine side whereas the right side corresponds to a transmission side.

Housing

As illustrated in FIG. 1, the torque transmission device housing 5 has a tubular part 5a, a first wall part 5b, a second wall part 5c and a holding part 50 for holding the pressing mechanism 60 on the inner peripheral side. The tubular part 5a has a first inner wall surface 501a and a second inner wall surface 501b. The second inner wall surface 501b is formed on the engine-side end of the tubular part 5a. The second inner wall surface 501b has an inner diameter greater than that of the first inner wall surface 501a.

The first wall part 5b is fixed to the engine-side end surface of the tubular part 5a. The outer peripheral surface of the first wall part 5b makes contact with the second inner wall surface 501b and the inner peripheral surface of a damper housing 8 (to be described). The second wall part 5c forms the transmission-side wall of the housing 5. The second wall part 5c is fixed to the transmission-side end surface of the tubular part 5a.

The holding part 50 is a part for supporting a pressing device 62 (to be described) on the inner peripheral side thereof. The holding part 50 forms the inner peripheral-side wall of the housing 5 on the transmission side of the housing 5. The holding part 50 is fixed to the second wall part 5c. The holding part 50 has a holding part main body 50a and a mounting portion 50b. The holding part main body 50a is formed in a cylindrical shape. The mounting portion 50b is integrally formed with the holding part main body 50a. The mounting portion 50b is outwardly protruding from an end of the holding part main body 50a. The mounting portion 50b is fixed to the transmission-side wall surface of the second wall part 5c on the inner peripheral side of the second wall part 5c.

Further, the damper housing 8 is fixed to the engine-side end surface of the tubular part 5a. The damper device 7 is accommodated inside the damper housing 8. Yet further, a transmission housing 9 is fixed to the transmission-side end surface of the tubular part 5a.

Input-Side Member

As illustrated in FIG. 1, the input-side member 15 is accommodated inside the torque transmission device housing 5. The input-side member 15 has an input portion 15a, an input-side member coupling portion 15b and an input-side member clutch engaging portion 15c. The input portion 15a is spline-coupled to the damper device 7. The coupling portion 15b is a portion extending radially outwards and axially towards the transmission from an axial end of the input portion 15a. In other words, the coupling portion 15b is a portion for coupling the input portion 15a and the clutch engaging portion 15c. The coupling portion 15b is integrally formed with the axial end of the input portion 15a. The coupling portion 15b is rotatably supported by the first wall part 5b through a bearing 20. The clutch engaging portion 15c is a portion extending axially towards the transmission from a radial end of the coupling portion 15b. The clutch engaging portion 15c is integrally formed with the radial end of the coupling portion 15b. The clutch engaging portion 15c has spline grooves formed on the outer periphery thereof.

Output-Side Member

As illustrated in FIG. 1, the output-side member 16 is accommodated inside the torque transmission device housing 5. The output-side member 16 has an output portion 16a, an output-side member coupling portion 16b and an output-side member clutch engaging portion 16c. The output portion 16a is a portion axially extending on the inner peripheral side. The output portion 16a is formed in a tubular shape. The output portion 16a is spline-coupled to a transmission-side shaft part. Specifically, the output portion 16a has spline grooves on the inner peripheral surface thereof. The spline grooves of the output portion 16a are engaged with a spline shaft formed on the transmission-side shaft part.

The engine-side end of the output-side member 16, for instance, the output portion 16a rotatably supports the input-side member 15 through a bearing 22. The transmission-side portion of the output-side member 16, for instance, the coupling portion 16b is rotatably supported through a bearing 23 by an axial extending portion 5d formed on the inner peripheral part of the second wall part 5c. The coupling portion 16b is a portion for coupling the output portion 16a and the clutch engaging portion 16c. The coupling portion 16b is integrally formed with an axial end of the output portion 16a. The coupling portion 16b is fixed to the clutch engaging portion 16c.

Specifically, the coupling portion 16b has a first annular section 116, a first cylindrical section 216 and a first flange section 316. The first annular section 116 is a section extending radially outwards from an axial end of the output portion 16a. The first annular section 116 is integrally formed with the axial end of the output portion 16a. The first cylindrical section 216 is a section extending axially towards the transmission from the outer peripheral part of the first annular section 116. The first cylindrical section 216 is integrally formed with the axial end of the output portion 16a.

Figure 4:
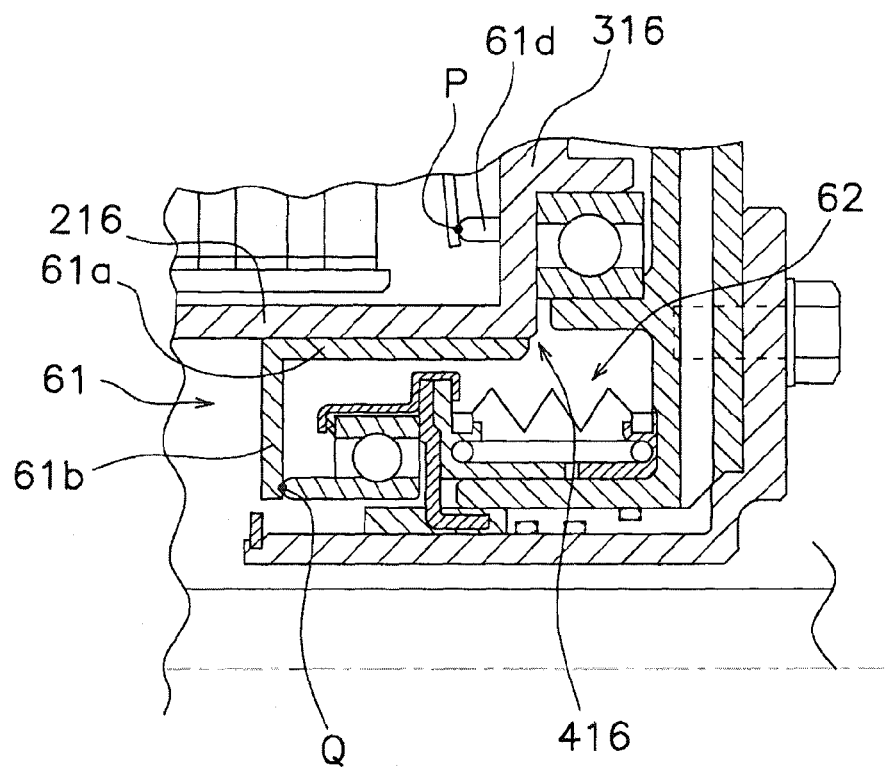
FIG. 4 is a partial cross-sectional view for explaining the engaged state between the output-side member and the pressing member.

The first flange section 316 is a section extending radially outwards from an axial end of the first cylindrical section 216. An end of the first flange section 316 is fixed to the clutch engaging portion 16c. Holes 316b are formed in a corner section 416 between the first cylindrical section 216 and the first flange section 316. For example, each holes 316b are formed by a hole section radially penetrating the first cylindrical section 216 on the transmission side and a hole section axially penetrating the first flange section 316 on the inner peripheral side. Thus, the plural holes 316 are formed in the aforementioned corner section 416. The plural holes 316b are respectively disposed at predetermined intervals in the circumferential direction. In other words, as illustrated in FIG. 4, the corner section 416 is formed by the first cylindrical section 216 and the first flange section 316, while being disposed between a given hole 316b and its circumferentially adjacent hole 316b.

The clutch engaging portion 16c is formed in a tubular shape on the outer peripheral side. The clutch engaging portion 16c has spline grooves formed on the inner peripheral surface thereof. The clutch engaging portion 16c is disposed for covering the outer periphery of the clutch.

Multi-Plate Clutch

As illustrated in FIG. 1, the multi-plate clutch 2 is the one for transmitting or cutting torque between the input-side member 15 and the output-side member 16. As illustrated in FIG. 1, the multi-plate clutch 2 is accommodated inside the torque transmission device housing 5.

The multi-plate clutch 2 includes: a plurality of ring-shaped first clutch plates 2a, each of which is not provided with any friction member fixed thereto; and a plurality of ring-shaped second clutch plates 2b, each of which is provided with friction members fixed to the both faces thereof. The first clutch plates 2a and the second clutch plates 2b are alternately disposed in the axial direction. Each first clutch plate 2a has a spline shaft formed on the inner peripheral part thereof. The spline shaft is engaged with the spline grooves formed on the input-side member clutch engaging portion 15c. Further, each second clutch plate 2b has a spline shaft formed on the outer peripheral part thereof. The spline shaft is engaged with the spline grooves formed on the output-side member clutch engaging portion 16c. Yet further, the multi-plate clutch 2 has a plurality of support protrusions 2c for supporting a lever member 65 to be described (see FIG. 2).

Motor Generator

As illustrated in FIG. 1, the motor generator 3 is the one for assisting the engine. The motor generator 3 is accommodated inside the torque transmission device housing 5. The motor generator 3 is disposed on the outer peripheral side of the multi-plate clutch 2.

The motor generator 3 includes a rotor 41 and a stator 42. The rotor 41 is fixed to the output-side member 16, for instance, the outer peripheral surface of the clutch engaging portion 16c. The rotor 41 includes a rotor magnet made of permanent magnet. The stator 42 is disposed in opposition to the rotor 41. The stator 42 is fixed to the torque transmission device housing 5, for instance, the first inner wall surface 501a of the tubular part 5a. The stator 42 includes a coil 43 and sends/receives electricity to/from a battery (not illustrated in the figures) connected thereto.

Pressing Mechanism

Figure 2:
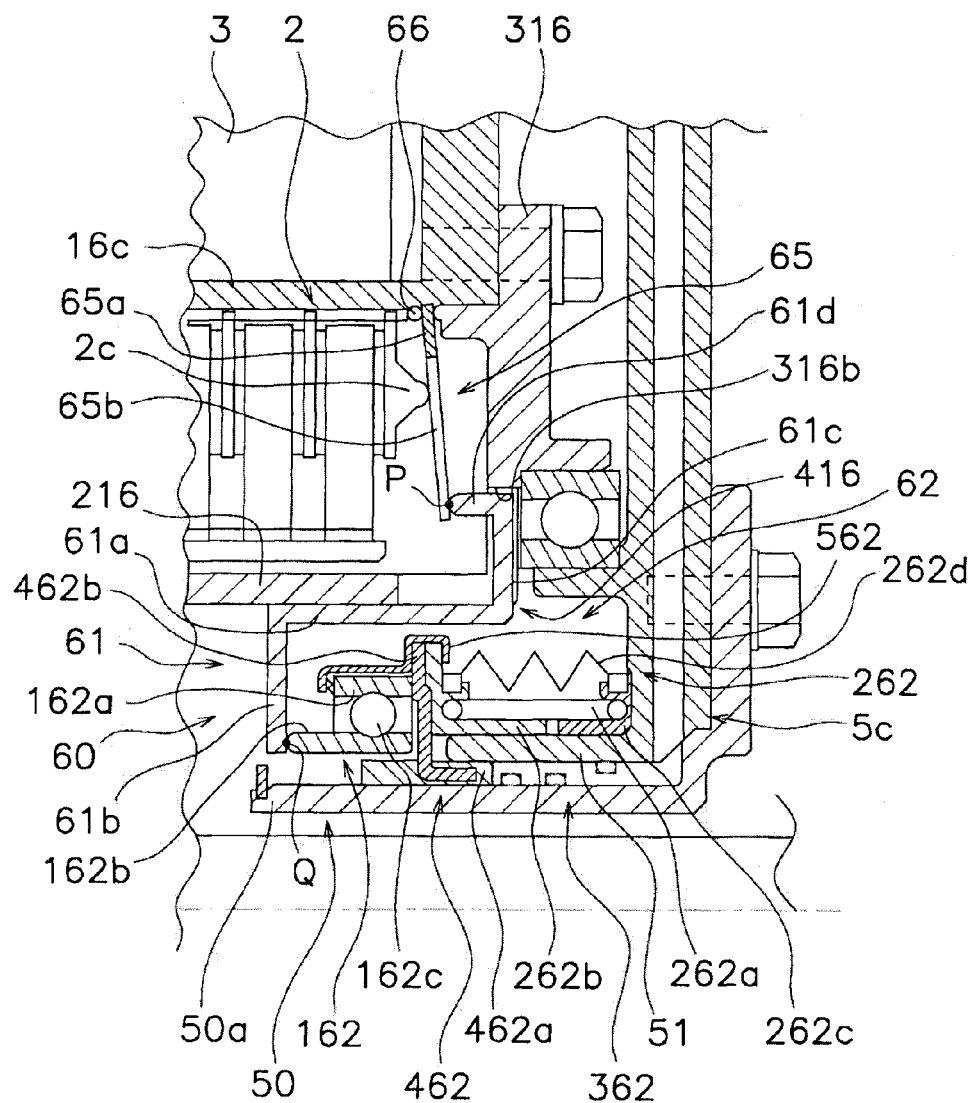
FIG. 2 is an enlarged cross-sectional view for explaining a pressing mechanism in detail.
Figure 3:
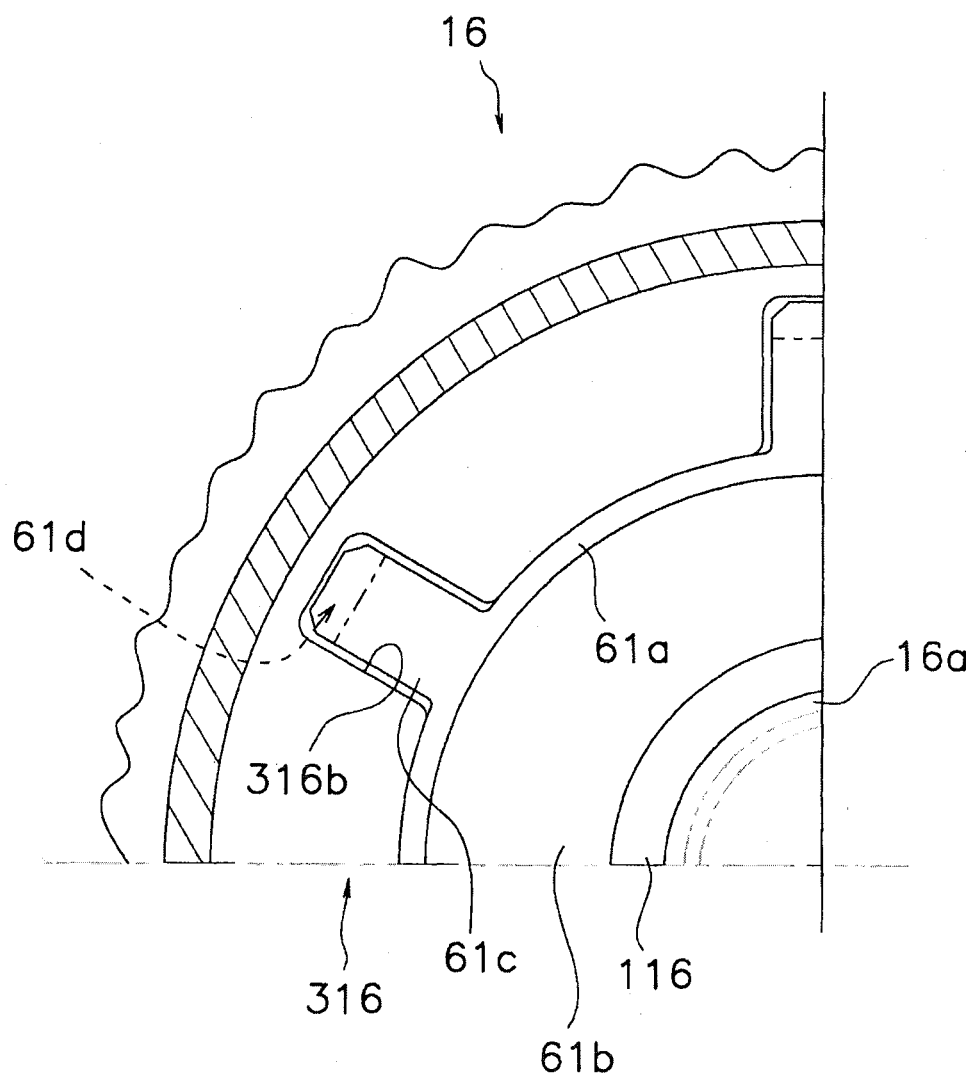
FIG. 3 is an external view illustrating an engaged state between an output-side member and a pressing member.

As illustrated in FIGS. 1 to 3, the pressing mechanism 60 is the one for pressing the multi-plate clutch 2. As illustrated in FIG. 1, the pressing mechanism 60 is accommodated inside the torque transmission device housing 5. The pressing mechanism 60 includes a pressing member 61 and the pressing device 62.

The pressing member 61 presses the multi-plate clutch 2. As illustrated in FIG. 2, the pressing member 61 is pressed by the pressing device 62 in a position Q offset towards the engine with reference to a position P (pressing position) in which the pressing member 61 presses the multi-plate clutch 2. The pressing member 61 is attached to the output-side member 16 so as to being integrally rotatable with and axially movable with respect to the output-side member 16.

As illustrated in FIGS. 2 and 3, the pressing member 61 has a second cylindrical portion 61a, a second annular portion 61b, second protruding portions 61c and pressing portions 61d. The second cylindrical portion 61a is formed in an axially cylindrical shape. The second cylindrical portion 61a is disposed on the inner peripheral side of the first cylindrical section 216 while being axially movable. More specifically, the second cylindrical portion 61a is disposed while being axially slidable with the inner peripheral surface of the first cylindrical section 216.

The second annular portion 61b is a portion to be pressed by the pressing device 62. The second annular portion 61b is integrally formed with the second cylindrical portion 61a while being protruding radially inwards from one end of the second cylindrical portion 61a. The second annular portion 61b is disposed on the inner peripheral side of the first cylindrical section 216 while being disposed on the transmission side with reference to the first annular section 116 (see FIG. 1). The second protruding portions 61c are integrally formed with the second cylindrical portion 61a while being protruding radially outwards from the other end of the second cylindrical portion 61a. The plural second protruding portions 61c are formed on the second cylindrical portion 61a. The plural second protruding portions 61c are respectively disposed on the second cylindrical portion 61a while being disposed at predetermined intervals in the circumferential direction. Each second protruding portion 61c is at least partially disposed in each hole 316b of the output-side member 16. For example, when the multi-plate clutch 2 is in the off-state, the second protruding portions 61c are disposed in engagement with the holes 316b (the hole sections in the first flange section 316). When the pressing member 61 is then pressed by the pressing device 62, the pressing member 61 is moved axially towards the engine while the inner peripheries of the second protruding portions 61c are engaged with the holes 316b (the hole sections in the first cylindrical section 216).

The pressing portions 61d are portions for pressing the multi-plate clutch 2. The pressing portions 61d are integrally formed with the ends of the second protruding portions 61c. Specifically, the pressing portions 61d are integrally formed with the second protruding portions 61c while being protruding axially towards the engine from the ends of the second protruding portions 61c. Each pressing portion 61d is formed so that the protruding length of each pressing portion 61d can be greater than the axial length of each hole 316b of the output-side member 16. As illustrated in FIGS. 2 and 4, while the pressing portions 61d and the second protruding portions 61c are disposed in the holes 316b of the output-side member 16, the tips of the pressing portions 61d are protruding from the axially engine-side surface of the first flange section 316 in the output-side member 16. More specifically, the tips of the pressing portions 61d are protruding from the axially engine-side surface of the first flange section 316 while being disposed outwards of the first cylindrical section 216 of the output-side member 16. Further, the tips of the pressing portions 61d make contact with the lever member 65.

In such pressing portions 61d, when the multi-plate clutch 2 is in the off-state, partially the pressing portions 61d, for instance, the base ends of the pressing portions 61d, are engaged with the holes 316b (the hole sections in the first flange section 316). When the pressing member 61 is then pressed by the pressing device 62, the pressing portions 61d and the holes 316b are disengaged from each other, and the pressing member 61 is moved axially towards the engine. With the moving, the tips of the pressing portions 61d press the multi-plate clutch 2 through the lever member 65.

The lever member 65 is the one for transmitting the pressing force of the pressing member 61 to the multi-plate clutch 2. When the pressing force of the pressing member 61 is transmitted to the lever member 65, the multi-plate clutch 2 is set to be in the on-state. Further, the clutch state of the multi-plate clutch 2 is changed into the off-state from the on-state by resilience of the lever member 65.

As illustrated in FIGS. 1 and 2, the lever member 65 is disposed between the multi-plate clutch 2 and the pressing member 61. Specifically, the lever member 65 is disposed between the multi-plate clutch 2 and the pressing portions 61d of the pressing member 61. The lever member 65 is formed in a disc shape.

As illustrated in FIG. 2, the lever member 65 is formed by an annular elastic portion 65a and a plurality of lever portions 65b. The annular elastic portion 65a is supported by the multi-plate clutch 2 and the first flange section 316 of the output-side member 16. Specifically, the outer peripheral part of the annular elastic portion 65a is supported between the outer peripheral part of the multi-plate clutch 2 and the first flange section 316 of the output-side member 16 through a positioning member 66. The positioning member 66 is formed in an annular shape. The positioning member 66 is disposed between the outer peripheral part of the multi-plate clutch 2 and that of the annular elastic portion 65a. Thus, the lever member 65 can be reliably held and positioned with the arrangement of the positioning member 66.

The lever portions 65b are portions extending radially inwards from the inner peripheral part of the annular elastic portion 65a. The center sections of the respective lever portions 65b make contact with the support protrusions 2c of the multi-plate clutch 2. The tips of the pressing portions 61d of the pressing member 61 make contact with the tips of the respective lever portions 65b. The plural lever portions 65b are respectively disposed on the inner peripheral part of the annular elastic portion 65a at predetermined intervals. The respective intervals among the plural lever portions 65b are set to be equal to those among the plural second protruding portions 61c.

Under the condition, when the tips of the respective lever portions 65b are pressed by the tips of the pressing portions 61d of the pressing member 61, the respective lever portions 65b are curved axially towards the engine around the support protrusions 2c serving as fulcrums. Accordingly, the multi-plate clutch 2 is pressed by the respective lever portions 65b and is thereby turned on. On the other hand, when the pressing force of the pressing member 61 is released, the lever portions 65b are moved axially towards the transmission by resilience of the lever portions 65b in the curved state. Accordingly, the pressing force of the lever member 65 onto the multi-plate clutch 2 is released, and the multi-plate clutch 2 is turned off.

The pressing device 62 is the one for pressing the pressing member 61. The pressing device 62 is disposed on the inner peripheral side of the multi-plate clutch 2 within the housing 5. Further, the pressing device 62 is disposed offset towards the engine with reference to the pressing position P. Such pressing device 62 is held by the holding part 50 on the inner peripheral side of the multi-plate clutch 2.

The pressing device 62 includes: a pressing bearing 162; an urging member 262 for positioning the pressing bearing 162; a piston 362; and a pressing force transmitting member 462 for transmitting pressing force to the pressing bearing 162.

The pressing bearing 162 includes an outer race 162a, an inner race 162b and a plurality of balls 162c that roll between the outer race 162a and the inner race 162b. The pressing force transmitting member 462 makes contact with the outer race 162a. The inner race 162b is formed so that the axial length thereof can be greater than that of the outer race 162a. The inner race 162b makes contact with the pressing member 61, for instance, the second annular portion 61b of the pressing member 61. The plural balls 162c roll between the outer race 162a and the inner race 162b while being disposed therebetween. In such pressing bearing 162, the inner race 162b presses the pressing member 61 when the outer race 162a is pressed by the pressing force transmitting member 462. Thus, the pressing member 61 is pressed by the pressing device 62. It should be noted that the pressing bearing 162 is rotatable in the circumferential direction, while the pressing force transmitting member 462 makes contact with the outer race 162a whereas the pressing member 61 makes contact with the inner race 162b.

The urging member 262 is the one for positioning the pressing bearing 162. Also, the urging member 262 is the one for positioning the pressing member 61. The urging member 262 is disposed between the housing 5 and the pressing bearing 162 on the inner peripheral side of the housing 5. Accordingly, the urging member 262 urges the pressing bearing 162 towards the engine. More specifically, the urging member 262 is disposed between the housing 5 and the pressing force transmitting member 462 on the inner peripheral side of the housing 5. Accordingly, the urging member 262 urges the pressing bearing 162 axially towards the engine through the pressing force transmitting member 462.

The urging member 262 includes: an elastic member 262a; first and second support parts 262b and 262c for supporting the elastic member 262a; and a cover member 262d. The elastic member 262a is disposed between the housing 5 and the pressing force transmitting member 462 while being compressed between the first support part 262b and the second support part 262c. Further, the elastic member 262a is disposed on a flange portion 51 formed on the inner peripheral part of the second wall part 5c of the housing 5 while being compressed between the first support part 262*b* and the second support part 262*c*. Thus, the elastic member 262*a* urges the pressing bearing 162 axially towards the engine through the pressing force transmitting member 462. Accordingly, the pressing bearing 162 is axially positioned while being interposed and held between the pressing member 61 and the pressing force transmitting member 462. For example, a coil spring is herein used as the elastic member 262*a*.

The cover member 262*d* is the one for restricting intrusion of foreign substance into the elastic member 262*a*. The cover member 262*d* is disposed radially outwards of the urging member 262, for instance, radially outwards of the elastic member 262*a*. The cover member 262*d* is formed to be axially extendable and contractible. The both axial ends of the cover member 262*d* are supported by the first support part 262*b* and the second support part 262*c*.

The piston 362 is the one for pressing the pressing bearing 162. Specifically, the piston 362 is the one for pressing the pressing bearing 162 through the pressing force transmitting member 462. The piston 362 is disposed between the second wall part 5*c* of the torque transmission device housing 5 and the holding part 50 of the torque transmission device housing 5. More specifically, the piston 362 is disposed between the flange portion 51 formed on the inner peripheral part of the second wall part 5*c* of the housing 5 and the holding part main body 50*a* of the holding part 50 of the housing 5. The piston 362 is configured to be axially movable by hydraulic pressure to be supplied thereto from an oil path. It should be noted that the hydraulic pressure is controlled by a hydraulic pressure control unit and/or so forth (not illustrated in the figures).

The pressing force transmitting member 462 is disposed between the piston 362 and the pressing bearing 162, and is configured to transmit pressing force from the piston 362 to the pressing bearing 162. The pressing force transmitting member 462 is disposed between the urging member 262 and the pressing bearing 162, and is configured to transmit urging force from the urging member 262 to the pressing bearing 162.

The pressing force transmitting member 462 has: a first contact portion 462*a* with which the piston 362 makes contact; and a second contact portion 462*b* with which the urging member 262 makes contact. The first contact portion 462*a* is formed in a cylindrical shape. The first contact portion 462*a* is disposed between the flange portion 51 formed on the inner peripheral part of the second wall part 5*c* of the housing 5 and the holding part main body 50*a* of the holding part 50 of the housing 5. The piston 362 makes contact with the axially transmission-side end of the first contact portion 462*a*. When the piston 362 is moved axially towards the engine by hydraulic pressure, the first contact portion 462*a* is pressed by the piston 362 and the first contact portion 462*a* is also moved axially towards the engine.

It should be noted that the pressing force transmitting member 462, the urging member 262 and the pressing bearing 162 are axially held by a clip member 562, while the pressing force transmitting member 462 is interposed and held between the urging member 262 and the pressing bearing 162. The clip member 56 has a hook portion formed thereon. The clip member 562 herein holds the pressing bearing 162, the pressing force transmitting member 462 and the urging member 262 (the first support part 262*b*), while the hook portion is engaged with the outer race of the pressing bearing 162.

The second contact portion 462*b* is a portion outwardly protruding from the axially center part of the first contact portion 462*a*. The second contact portion 462*b* is disposed between the pressing bearing 162 and the urging member 262. Specifically, the second contact portion 462*b* makes contact with the outer race 162*a* of the pressing bearing 162 on the engine side. Further, the second contact portion 462*b* makes contact with the first support part 262*b* of the urging member 262 on the transmission side. Thus, the second contact portion 462*b* is interposed and held between the outer race 162*a* of the pressing bearing 162 and the first support part 262*b* of the urging member 262.

When the first contact portion 462*a* is herein pressed by the piston 362 and is thereby moved axially towards the engine, the second contact portion 462*b* is also moved axially towards the engine. Accordingly, the pressing bearing 162 is pressed axially towards the engine by the second contact portion 462*b*, and is thereby moved axially towards the engine. Accordingly, the pressing member 61 is pressed by the pressing bearing 162. Thus, the pressing member 61 is pressed by the pressing device 62.

Damper Device

As illustrated in FIG. 1, the damper device 7 is the one for transmitting the torque of the engine and for absorbing and damping torsional vibrations. The damper device 7 is disposed on the inner peripheral side of the motor generator 3. The damper device 7 is the one structured by preliminarily pressing a friction disc part of a heretofore known damper disc assembly by a disc spring and/or a ring-shaped plate with predetermined pressing force. The damper device 7 is fixed to a flywheel 12. Further, the flywheel 12 is fixed to the crankshaft 6. Thus, the damper device 7 is attached to the crankshaft 6 through the flywheel 12.

[Action of Torque Transmission Device]

(1) Starting Moving by Motor

In starting moving by motor, electric power is supplied to the motor generator 3 while the multi-plate clutch 2 is set to be in the off (decoupled) state. The motor generator 3 is thereby driven, and the driving force thereof is transmitted from the output-side member 16 of the multi-plate clutch 2 to the transmission-side shaft part. Accordingly, the vehicle is started moving only by the motor generator 3. Then, at the timing when the rotation speed of the rotor 41 of the motor generator 3 becomes equivalent to the idling rotation speed of the engine, the multi-plate clutch 2 is set to be in the on (connected) state and the engine is started.

(2) Low Load Acceleration Travelling

In low load acceleration travelling, the driving force of the motor generator 3 is reduced while the driving force of the engine is increased. Then, the vehicle is finally accelerated only by the driving force of the engine, while the driving force of the motor generator 3 is set to be zero.

(3) Creep Travelling Only by Motor Generator

In creep travelling only by the motor generator 3, while the multi-plate clutch 2 is set to be in the off-state, fuel supply to the engine is stopped and only the motor generator 3 is driven. In this case, the driving force of the motor generator 3 is transmitted to the transmission-side shaft part through the output-side member 16, and this makes the vehicle travel. In this state, the multi-plate clutch 2 is in the off-state. Therefore, the driving force of the motor generator 3 is not being transmitted to the engine side. In other words, the engine is not herein driven by the motor generator 3. Therefore, driving loss can be prevented without influence of engine friction. Further, the speed is minutely regulated by the rotation control of the motor generator 3, and it is not required to execute a complex half-clutch control.

(4) Travelling Only by Engine

In travelling only by the engine, the engine is driven while the multi-plate clutch 2 is set to be in the on-state. In this case, electric power is not supplied to the motor generator 3.

Accordingly, the torque from the engine is inputted into the input-side member 15 through the damper device 7. Then, the torque is transmitted to the transmission-side shaft through the multi-plate clutch 2 and the output-side member 16. Thus, the vehicle is caused to travel only by the engine.

(5) High Load Travelling

In high load travelling, the engine and the motor generator 3 are both driven while the multi-plate clutch 2 is set to be in the on-state. In this case, the torque from the engine is inputted into the input-side member 15 through the damper device 7. Then, the torque is transmitted to the transmission-side shaft through the multi-plate clutch 2 and the output-side member 16. On the other hand, at this time, the driving force of the motor generator 3 is transmitted to the transmission-side shaft from the output-side member 16. Thus, the driving forces of the both components are transmitted to driving wheels, and high load travelling is enabled by the vehicle.

(6) Light Deceleration and Light Braking

In light deceleration and light braking, the multi-plate clutch 2 is turned off. In this case, the driving force from the transmission side is transmitted to the motor generator 3 through the transmission-side shaft and the output-side member 16. Thereby, the motor generator 3 is reversely driven. Accordingly, the motor generator 3 generates electricity, and the battery is charged while deceleration energy is regenerated. Then, in charging the battery, regenerative braking is implemented. At this time, the multi-plate clutch 2 is set to be in the off-state. Therefore, driving force is not transmitted to the engine side, and friction loss attributed to reverse driving of the engine does not occur. Thus, reduction in power generation amount is prevented in the motor generator 3.

(7) Abrupt Deceleration and Abrupt Braking

In abrupt deceleration and abrupt braking, the multi-plate clutch 2 is turned on. In this case, the motor generator 3 and the engine are reversely driven simultaneously by the transmission-side driving force. Thus, friction of the engine can be also used in addition to regenerative braking. Therefore, high deceleration force and high braking force can be obtained.

[Action of Pressing Mechanism]

In the torque transmission device configured to act as described above, the on/off state of the multi-plate clutch 2 is controlled by the pressing mechanism 60.

First, when the operating oil is supplied from the hydraulic pressure control unit and/or so forth to the oil path formed between the holding part 50 and the hydraulic pressure control unit and/or so forth, the piston 362 is moved axially towards the engine by the hydraulic pressure of the operating oil. Next, the first contact portion 462a of the pressing force transmitting member 462 is pressed by the piston 362. Accordingly, the outer race 162a of the pressing bearing 162 is pressed axially towards the engine by the second contact portion 462b of the pressing force transmitting member 462. Then, the second annular portion 61b of the pressing member 61 is pressed axially towards the engine by the inner race 162b of the pressing bearing 162.

Thus, the pressing member 61 is pressed by the pressing device 62. Subsequently, when the pressing member 61 is pressed axially towards the engine at the second annular portion 61b, the lever member 65 is pressed axially towards the engine by the pressing portions 61d of the pressing member 61. Accordingly, the multi-plate clutch 2 is pressed by the pressing force of the lever member 65. The multi-plate clutch 2 is thereby set to be in the on-state.

By contrast, when the operating oil is retrieved from the oil pass and/or so forth by the hydraulic pressure control unit and/or so forth, the hydraulic pressure of the operating oil is reduced. Then, the piston 362 is enabled to move axially towards the transmission, and the pressing force of the pressing member 61 is released. Accordingly, the tips of the lever portions 65b of the lever member 65 are moved axially towards the transmission by the resilience of the lever portions 65b. The pressing force of the lever member 65 onto the multi-plate clutch 2 is thus released. The multi-plate clutch 2 is thereby set to be in the off-state.

[Advantageous Effects of Torque Transmission Device]

In the torque transmission device 1 as described above, the multi-plate clutch 2 is set to be in the on-state when the pressing device 62 presses the pressing member 61 on the inner peripheral side of the multi-plate clutch 2. Further, in the torque transmission device 1, even when the pressing member 61 is configured to be pressed by the pressing device 62 on the inner peripheral side of the multi-plate clutch 2, pressing of the pressing member 61 by the pressing device 62 can be configured to be released. Thus, in the present torque transmission device, the multi-plate clutch 2 can be reliably turned on and off even when the pressing device 62 is disposed on the inner peripheral side of the clutch.

Further, in the torque transmission device 1, the pressing device 62 is disposed on the inner peripheral side of the multi-plate clutch 2. When described in detail, in the torque transmission device 1, the pressing device 62 is disposed offset towards the engine with reference to the pressing position P in which the pressing member 61 presses the multi-plate clutch 2. Therefore, the axial dimension of the torque transmission device 1 can be reduced. Further, in the torque transmission device 1, the damper device 7 is disposed on the inner peripheral side of the motor generator 3. Therefore, the axial dimension of the torque transmission device 1 can be further reduced. Thus, the torque transmission device 1 can be compactly provided.

Further, in the torque transmission device 1, the pressing member 61 is pressed by the pressing device 62 in the position Q offset towards the engine with reference to the aforementioned pressing position P. In other words, the pressing member 61 is formed so that the pressing device 62 can press the pressing member 61 in the position offset towards the engine. Accordingly, even when the pressing device 62 is disposed on the inner peripheral side of the multi-plate clutch 2, the pressing member 61 can reliably press the multi-plate clutch 2.

Further, in the torque transmission device 1, the pressing member 61 is attached to the output-side member 16 and is integrally rotatable with and axially movable with respect to the output-side member 16. Specifically, the second protruding portions 61c and the pressing portions 61d of the pressing member 61 are disposed in the holes 316b of the output-side member 16. Thus, with attachment of the pressing member 61 to the output-side member 16, torque can be reliably transmitted to the transmission by the output-side member 16 while the multi-plate clutch 2 can be reliably pressed by the pressing member 61.

Other Exemplary Embodiments

The present invention is not limited to the exemplary embodiment as described above, and a variety of changes or modifications can be made without departing from the scope of the present invention. It should be noted that further compactness can be achieved, for instance, when a CSC (Concentric Slave Cylinder) mechanism is disposed on the inner peripheral side of the clutch under the assumption that a dry multi-plate clutch is employed in the aforementioned exemplary embodiment.

Advantageous Effects of Invention

According to the present invention as described above, it is possible to provide a compact torque transmission device.

INDUSTRIAL APPLICABILITY

The present invention can be used for a torque transmission device for transmitting the torque of an engine to a transmission.

The invention claimed is:

1. A torque transmission device for transmitting a torque of an engine to a transmission and for assisting the engine, the torque transmission device comprising:
    an input-side member;
    an output-side member having a hole portion;
    a clutch configured to transmit and cut the torque between the input-side member and the output-side member; and
    a pressing mechanism including a pressing member configured to press the clutch; and a pressing device configured to press the pressing member, a protruding portion of the pressing member being at least partially engaged with the hole portion of the output-side member,
    the pressing device disposed on an inner peripheral side of the clutch.

2. The torque transmission device recited in claim 1, wherein
    the pressing member is configured to press the clutch at a reference point,
    the pressing device is disposed at a position between the engine and the reference point.

3. The torque transmission device recited in claim 2, wherein
    the pressing device is configured to press the pressing member at a position between the engine and the reference point.

4. The torque transmission device recited in claim 2, wherein
    the pressing member is attached to the output-side member, and
    the pressing member is integrally rotatable with and axially movable with respect to the output-side member.

5. The torque transmission device recited in claim 4, wherein
    the pressing member has a cylindrical portion, the protruding portion outwardly protruding from the cylindrical portion, and a pressing portion formed on an end of the protruding portion in order to press the clutch.

6. The torque transmission device recited in claim 1, further comprising
    a motor generator configured to assist the engine, wherein the motor generator is configured on an outer peripheral side of the clutch.

7. The torque transmission device recited in claim 1, further comprising
    a damper device configured to transmit the torque of the engine and to absorb and damp a torsional vibration, wherein
    the damper device is disposed on an inner peripheral side of the motor generator.

* * * * *